(12) United States Patent
Campbell et al.

(10) Patent No.: US 9,013,994 B2
(45) Date of Patent: Apr. 21, 2015

(54) DISTRIBUTED CHASSIS ARCHITECTURE HAVING INTEGRATED SERVICE APPLIANCES

(75) Inventors: Alexander Philip Campbell, Kanata (CA); Keshav Govind Kamble, Fremont, CA (US); Dar-Ren Leu, San Jose, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/454,956

(22) Filed: Apr. 24, 2012

(65) Prior Publication Data

US 2013/0107713 A1    May 2, 2013

Related U.S. Application Data

(63) Continuation of application No. 13/281,481, filed on Oct. 26, 2011.

(51) Int. Cl.
*H04L 12/26* (2006.01)
*H04L 12/931* (2013.01)

(52) U.S. Cl.
CPC ............ *H04L 49/358* (2013.01); *H04L 49/355* (2013.01)

(58) Field of Classification Search
USPC .......................... 370/235; 726/1, 11; 709/225
See application file for complete search history.

(56) References Cited

U.S. PATENT DOCUMENTS

| 6,473,434 | B1 | 10/2002 | Araya et al. |
| 7,539,183 | B2 | 5/2009 | Harris et al. |
| 7,577,136 | B1 | 8/2009 | Devanagondi et al. |
| 7,773,510 | B2 | 8/2010 | Back et al. |
| 7,843,914 | B2 | 11/2010 | Havemann et al. |
| 7,948,986 | B1 | 5/2011 | Ghosh et al. |

(Continued)

FOREIGN PATENT DOCUMENTS

| KR | 20070059447 A | 6/2007 |
| WO | 02071206 A2 | 9/2002 |
| WO | 2011044396 A2 | 4/2011 |

OTHER PUBLICATIONS

Karlin, "Embedded Computational ELements in Extensible Routers", Dissertation, Dept. of Computer Science, Princeton University, Jan. 2003, 162 pages.

(Continued)

*Primary Examiner* — Dang Ton
*Assistant Examiner* — Lionel Preval
(74) *Attorney, Agent, or Firm* — Schmeiser, Olsen & Watts LLP; Michael Rodriguez

(57) ABSTRACT

A distributed virtual chassis comprises scaled-out fabric coupler (SFC) boxes. Each SFC box has fabric ports and a cell-based switch fabric for switching cells associated with a packet among the SFC fabric ports of that SFC box. Distributed line cards (DLCs) include switching DLCs and an appliance DLC (A-DLC). Each switching DLC has network ports. Each switching DLC and A-DLC has DLC fabric ports. Each switching DLC and A-DLC is connected to each of the SFC boxes. The A-DLC provides an upper layer service for packets arriving on the network ports of the switching DLCs. To forward a packet to the A-DLC, a switching DLC divides the packet into cells and distributes the cells among the SFC boxes. The SFC boxes forward the cells to the A-DLC, and the A-DLC reassembles the packet from the cells and provides the upper layer service to the packet.

10 Claims, 7 Drawing Sheets

(56) References Cited

U.S. PATENT DOCUMENTS

| | | | |
|---|---|---|---|
| 8,339,959 B1* | 12/2012 | Moisand et al. | 370/235 |
| 8,510,821 B1* | 8/2013 | Brandwine et al. | 726/11 |
| 2002/0083175 A1* | 6/2002 | Afek et al. | 709/225 |
| 2003/0200330 A1 | 10/2003 | Oelke et al. | |
| 2004/0088538 A1 | 5/2004 | Isip et al. | |
| 2007/0168475 A1 | 7/2007 | Mullahy et al. | |
| 2008/0307493 A1* | 12/2008 | Moghe et al. | 726/1 |
| 2009/0063625 A1 | 3/2009 | Bagepalli et al. | |
| 2010/0103837 A1 | 4/2010 | Jungck et al. | |
| 2010/0165985 A1 | 7/2010 | Sharma et al. | |
| 2011/0262135 A1 | 10/2011 | Boduch et al. | |
| 2012/0051735 A1 | 3/2012 | Achkir et al. | |

OTHER PUBLICATIONS

Kelly et al., "Rapid Service Creation Using the JUNOS SDK", ACM SIGCOMM Computer Communication Review, vol. 40 No. 1, Jan. 2010, pp. 56-60.
"Turning the Corner on Innovation" Packet Magazine, vol. 16 No. 3, Aug. 2004, pp. 35-39.
Otteson, "Reinventing the Router", Packet Magazine, vol. 16 No. 3, Aug. 2004, pp. 41-46.
Non-Final Office Action in related U.S. Appl. No. 13/281,481, mailed on Jun. 5, 2013; 19 pages.
International Search Report and Written Opinion in counterpart International Application No. PCT/CN2012/076967, mailed Sep. 27, 2012; 12 pages.
Final Office Action in related U.S. Appl. No. 13/281,481, mailed on Dec. 24, 2013; 31 pages.
Notice of Allowance in related U.S. Appl. No. 13/281,481, mailed on Feb. 28, 2014; 8 pages.
Examination Report in related United Kingdom patent application No. 1407966.9, mailed on Jul. 4, 2014; 4 pages.
Examination Report in related United Kingdom patent application No. 1407966.9, mailed on Sep. 4, 2014; 3 pages.
Combined Search and Examination Report in related United Kingdom patent application No. 1416516.1, mailed on Oct. 7, 2014; 4 pages.

* cited by examiner

DISTRIBUTED CHASSIS ARCHITECTURE HAVING INTEGRATED SERVICE APPLIANCES

RELATED APPLICATIONS

This application is a continuation application claiming priority to and the benefit of the filing date of U.S. patent application Ser. No. 13/281,481, filed Oct. 26, 2011, entitled "Distributed Chassis Architecture Having Integrated Service Appliances," the contents of which are incorporated by reference herein in their entirety.

FIELD OF THE INVENTION

The invention relates generally to data centers and data processing. More particularly, the invention relates to integrating service appliances into a data center having a distributed chassis architecture.

BACKGROUND

Data centers are generally centralized facilities that provide Internet and intranet services needed to support businesses and organizations. A typical data center can house various types of electronic equipment, such as computers, servers (e.g., email servers, proxy servers, and DNS servers), switches, routers, data storage devices, and other associated components. The infrastructure of the data center, specifically, the layers of switches in the switch fabric, plays a central role in the support of the services. In addition, data centers need service appliances in order to provide packet-based services for traffic flows handled by the switches and other equipment.

SUMMARY

The invention features a method of integrating an upper layer networking service into a distributed virtual chassis. The method comprises associating a network port of a switching network element with a traffic filter for a traffic flow. A packet is received at the network port of the switching network element. It is determined, in response to the traffic filter, that the packet requires an upper layer service provided by an service appliance. The packet is divided into cells. The cells are forwarded to the service appliance through a cell-based switch fabric. The packet is reassembled at the service appliance from the cells. The upper layer service is performed on the reassembled packet at the service appliance.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Data centers described herein use a distributed chassis architecture, wherein central Scaled-Out Fabric Couplers (SFCs) connect to multiple Distributed Line Cards (DLCs) in a star topology. These SFCs and DLCs together form a distributed virtual chassis that serves as a large cell-switched domain with constant latency across all network ports. This distributed chassis architecture enables scaling the number of network ports into the tens of thousands.

For such a large network domain, various types of service appliances are required to provide Layer 4 through Layer 7 services (e.g., the OSI model defines Layer 4 through Layer 7 as the Transport, Session, Presentation, and Application layers, respectively). As used herein, Layer 4 through Layer 7 services are preferably referred to as upper layer services, whereas services below Layer 4 are referred to preferably as lower layer services. Examples of upper layer services include, but are not limited to, firewall services, Intrusion Prevention/Intrusion Detection (IPS/IDS) services, Server Load Balancing (SLB), and Application Delivery Centers (ADC) services. As described herein, service appliance boxes are integrated seamlessly into the distributed virtual chassis, the appliances becoming an integral part of the constant latency cell-switched backbone of the data center in their role of providing packet-based services to all network ports.

Figure 1:
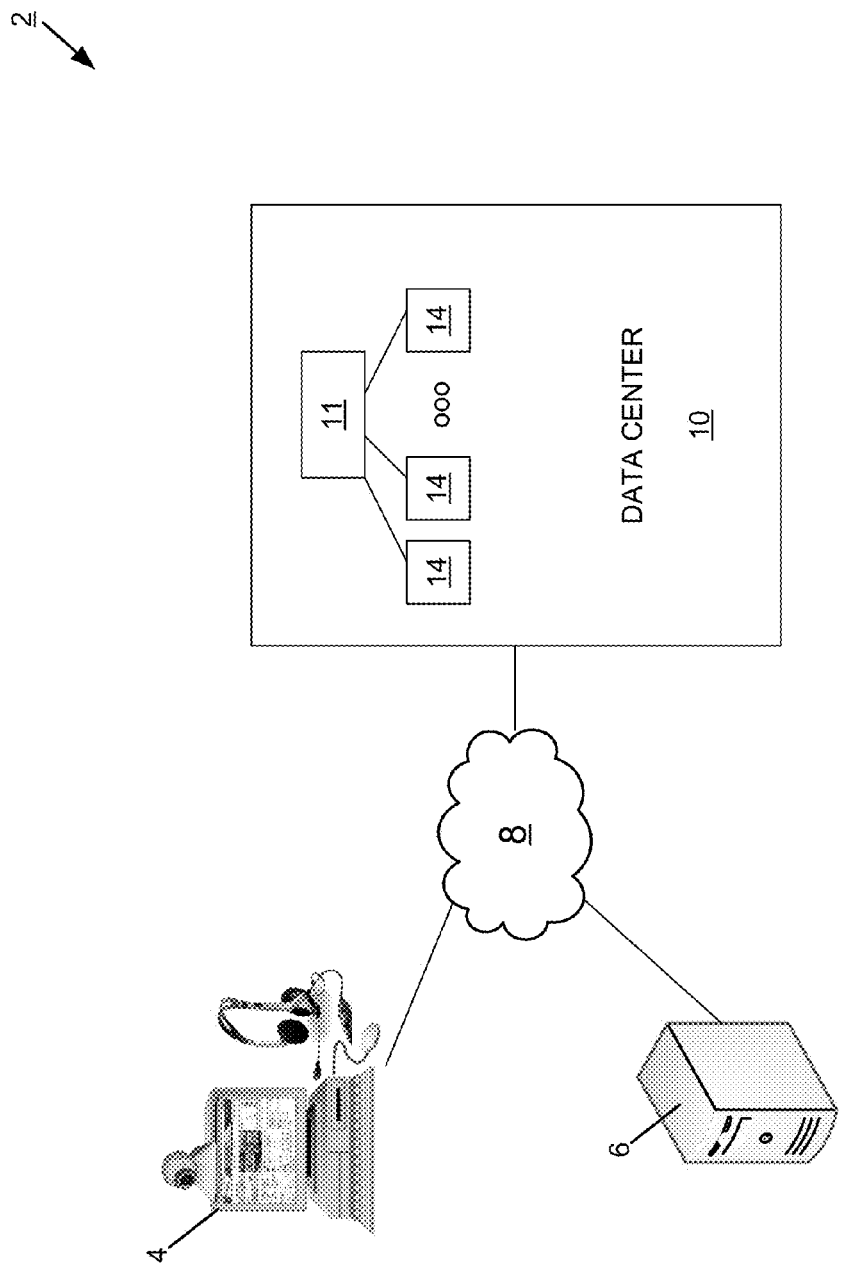
FIG. 1 is an embodiment of a network including a data center, a server, and a management station.

FIG. 1 shows an embodiment of a network environment 2 including a data center 10 in communication with a management station 4 and a server 6 over a network 8. Embodiments of the network 8 include, but are not limited to, local-area networks (LAN), metro-area networks (MAN), and wide-area networks (WAN), such as the Internet or World Wide Web. The data center 10 is generally a facility that houses various computers, routers, switches, and other associated equipment in support of applications and data that are integral to the operation of businesses and organizations. Such equipment includes a main cell-based switch 11 in communication with network elements, referred to herein as distributed line cards (DLCs) 14, one or more of which is an appliance DLC (A-DLC), as described in more detail below. The facility may be embodied at a single site or distributed among multiple sites.

The management station 4 can connect directly (point-to-point) or indirectly to a DLC 14 of the data center 10 over one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g), 802.11(n)). Using a network protocol, such as Telnet, the management station 4 can access a command-line interface (CLI) of the network element. In general, the server 6 is a computer (or group of computers) that provides one or more services to the data center 10, examples of which include, but are not limited to, email servers, proxy servers, DNS servers, and a control server running the control plane of the distributed virtual chassis, as further described below.

Figure 2:
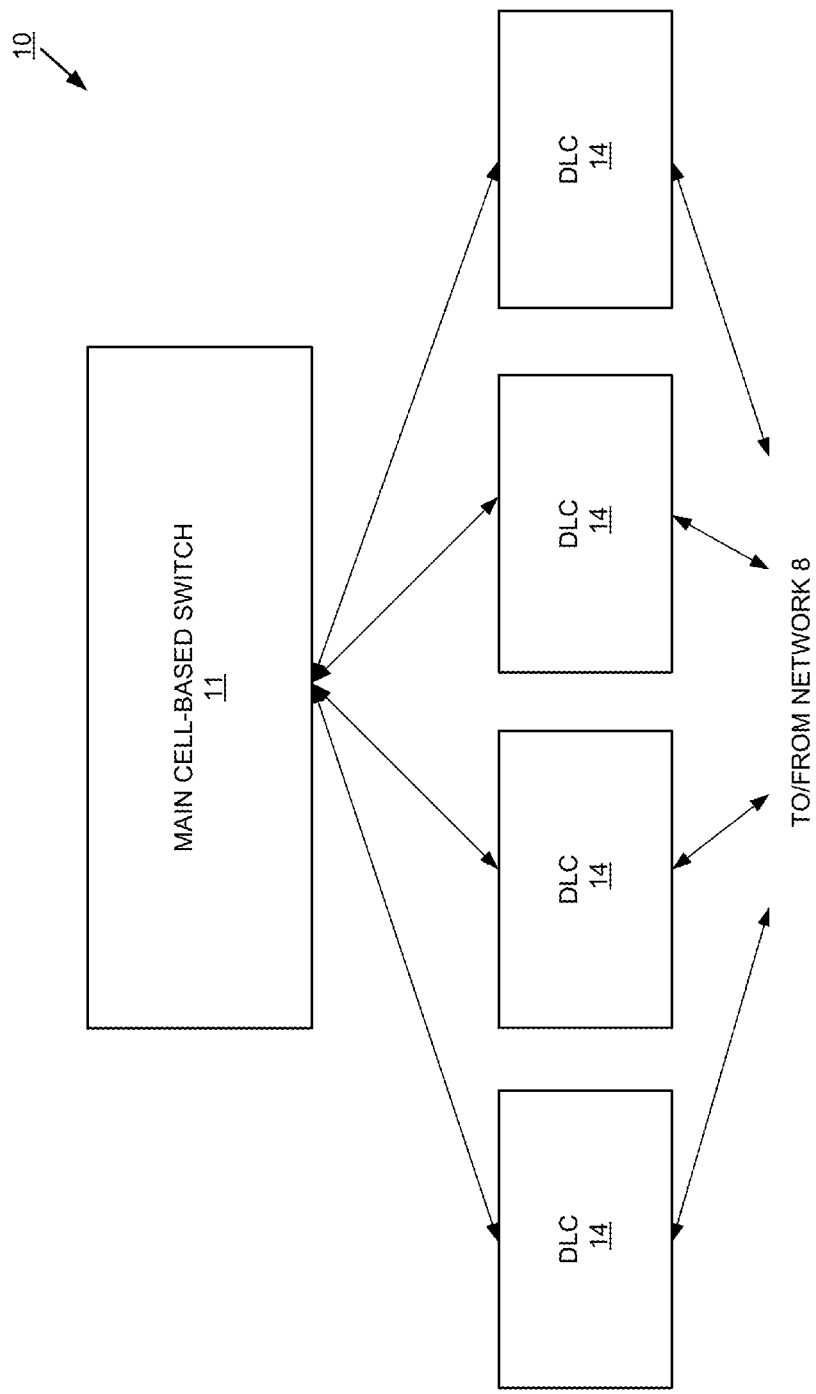
FIG. 2 is a diagram of an embodiment of the data center having a central main cell-based switch in communication with a plurality of distributed line card (DLC) boxes.

FIG. 2 shows an embodiment of the data center 10 with a distributed chassis architecture, wherein the main cell-based switch 11 is in communication with the plurality of DLCs 14. The main cell-based switch 11 and DLCs 14 together form the distributed virtual chassis and correspond to a single cell-switched domain. Although FIG. 2 only shows four DLCs 14, the number of DLCs in the cell-switched domain can range in the hundreds and thousands. The DLCs 14 belong to a designated cluster. Each cluster has a master (or controller) DLC, one or more standby or back-up DLCs, and one or more follower DLCs. The data center 10 can have more than one cluster, although each DLC can be the member of one cluster only.

In the data center 10, the functionality occurs on three planes: a management plane, a control plane, and a data plane. The management of the cluster, such as configuration management, runtime configuration management, presentation of information (show and display), graph generation, and handling SNMP requests, occurs on the management plane. The control plane is associated with those functions involving network signaling and control. The data plane manages data flow.

In the data center 10, the functionality of the management plane and, optionally, of the control plane is centralized (that is, the management plane functionality being implemented at the master DLC and the control plane being implemented predominately at the server 6) and the functionality of the data plane is distributed among the DLCs 14. Through the management station 4, an administrator of the data center communicates with the master DLC in order to manage the cluster, with conceivably thousands of DLCs, from a single location. To support the control plane functionality of the entire DLC cluster, the server 6 is configured with sufficient processing power (e.g., with multiple processor cores).

Figure 3:
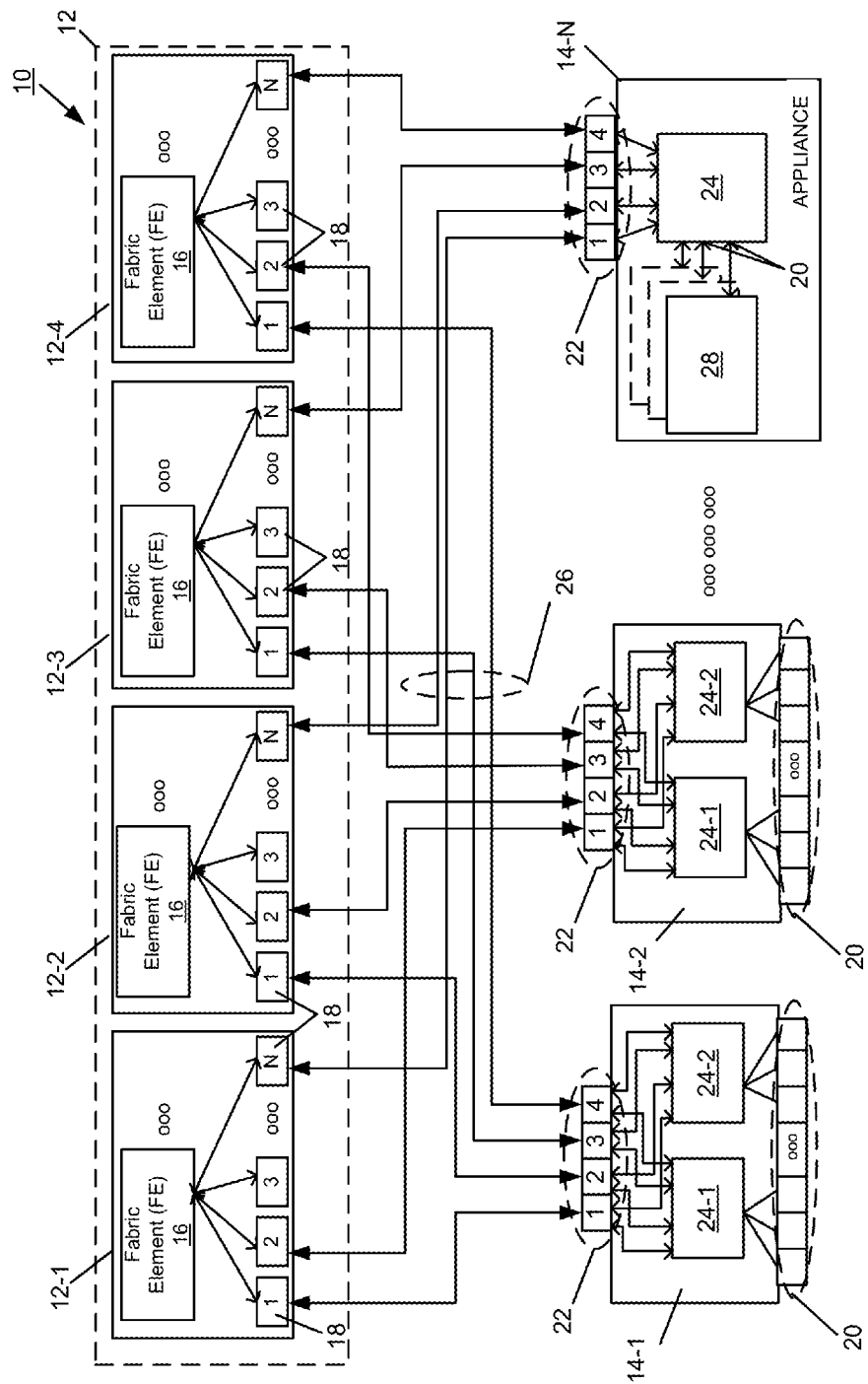
FIG. 3 is a diagram of an embodiment of the data center implemented as a distributed virtual chassis, wherein the central main switch has a plurality of scaled-out fabric coupler (SFC) boxes, each of which is in communication with each of the plurality of DLC boxes.

FIG. 3 shows an embodiment of the data center 10, wherein the main cell-based switch 11 includes a plurality of scaled-out fabric coupler (SFC) chasses or boxes 12-1, 12-M (generally, 12) in communication with the plurality of DLC chasses or boxes 14-1, 14-2, 14-N (generally, 14). This example embodiment has four SFC boxes (M=4) and N DLC boxes.

Each SFC box 12 includes one or more cell-based switch fabric elements (FE) 16 in communication with N fabric ports 18, there being at least as many fabric ports 18 in each SFC box 12 as the number of DLC boxes 14 in the distributed virtual chassis. Each fabric element 16 of an SFC box switches cells between fabric ports 18 of that SFC box based on destination information in the cell header.

The DLC boxes 14 include switching DLCs and one or more appliance DLCs (A-DLC). In their role of providing an upper layer service needed by the traffic flows passing through the data center 10, the one or more A-DLCs are integrated into the data plane of the data center 10. In the example of FIG. 3, the DLC box 14-N is an appliance DLC, and the other DLCs are switching DLCs. Examples of upper layer services include, but are not limited to, firewall services, intrusion protection services, intrusion detection services, and virtual private network (VPN) services.

Each switching and appliance DLC box 14 has a plurality of network ports 20 and a plurality of fabric ports 22. The network ports 20 of the switching DLCs are in communication with the network 8. In one embodiment, each switching DLC 14 has 40 network ports 20, with each of the network ports 20 being configured as a 10 Gbps Ethernet port; the aggregate bandwidth of these DLCs is 400 Gbps.

Preferably, each fabric port 22 of the switching and appliance DLCs includes a 120 Gbps CXP interface. In one embodiment, the CXP interface has twelve lanes (12×), each lane providing a 10 Gbps channel. An example specification of the 120 Gbps 12×CXP interface can be found in the "Supplement to InfiniBand™ Architecture Specification Volume 2 Release 1.2.1", published by the InfiniBand™ Trade Association. This embodiment of 12-lane CXP is referred to as standard Infiniband (IB) CXP. In another embodiment, the CXP interface has 10 lanes (10×) for supporting 10-lane applications, such as 100 Gigabit Ethernet. This embodiment of 10-lane CXP is referred to as Ethernet CXP.

Each switching DLC box 14 further includes a plurality of network processors (i.e., network switching elements) 24-1, 24-2 (generally, 24). In general, network processors are optimized for packet processing. Each network processor 24 is in communication with every fabric port 22 and with a subset of the network ports 20 (for example, each network processor 24 can switch cells derived from packet traffic received on 20 of the 40 network ports). An example implementation of the network processor 24 is the BCM 88650, a 20-port, 10 GbE switch device produced by Broadcom, of Irvine, Calif.

The appliance DLC box 14-N includes a network processor 24 in communication with processor complex 28 comprised of a multi-core network packet processor (NPP) with built-in acceleration for packet processing (APP). The NPP can be implemented, for example with Cavium Network's Octeon multi-core processor or LSI Logic's Tarari multi-core processor or NetLogic's/RMI's XLR multi-core processors. The network processor 24 forwards packets to the NPP 28 over one or more of the network ports 20 connected to the NPP 28.

The appliance DLC box 14-N can include multiple processor complexes 28 over other network ports of the network processor 24 (additional processor complexes 28 being shown in phantom). In such cases, each individual processor complex 28 provides the same or a different type of service (e.g. one processor complex can provide a firewall, another processor complex can provide IPS/IDS, and still another processor complex can provide a different appliance service, such as server load balancing (SLB). Because each of these processor complexes is connected to different network port or set of network ports of the network processor 24, the switching DLCs can forward their packets to those network ports for the specific service required.

In this embodiment, the distributed virtual chassis 10 has a full-mesh configuration: each switching and appliance DLC 14 is in communication with each of the SFCs 12; more specifically, each of the fabric ports 22 of a given DLC 14 is in electrical communication with a fabric port 18 of a different one of the SFCs 12 over a communication link 26. Referring to the A-DLC 14-N as a representative example of the DLCs 14, the A-DLC fabric port 22-1 of the A-DLC 14-N is in communication with the fabric port 18-N of the SFC 12-1, the A-DLC fabric port 22-2 with the fabric port 18-N of the SFC 12-2, the A-DLC fabric port 22-3 with the fabric port 18-N of the SFC 12-3, and the A-DLC fabric port 22-4 with the fabric port 18-N of the SFC 12-4. Connected in this full-mesh configuration, the switching DLCs, appliance DLC, and SFCs form the distributed virtual chassis, with the switching DLCs and A-DLC acting as line cards. The distributed virtual chassis is modular; that is, switching DLCs and appliance DLCs can be added to or removed from the distributed virtual chassis, one at a time, like line cards added to or removed from a chassis.

The communication link 26 between each DLC fabric port 22 and an SFC fabric port 18 can be a wired connection. Interconnect variants include Direct Attached Cable (DAC) or optical cable. DAC provides five to seven meters of cable length; whereas the optical cable offers up to 100 meters of connectivity within the data center, (standard optical connectivity can exceed 10 km). Alternatively, the communication link 26 can be a direct physical connection (i.e., electrical connectors of the DLC fabric ports 22 physically connect directly to electrical connectors of the SFC fabric ports 18).

The full-mesh configuration of FIG. 3, having the four SFC boxes 12, is a full-line rate configuration, that is, the aggregate bandwidth for transmitting cells from a given DLC to the SFCs (i.e., 480 Gbps) is greater than the aggregate bandwidth of packets arriving at the given DLC on the network ports 20 (i.e., 400 Gbps). This full-line rate configuration achieves a 2.5 μs constant latency throughout the switch domain (2.0 μs of the 2.5 μs latency being attributed to packet ingress and egress at the switching chip and 0.5 μs being attributed to the switching latency at the fabric elements of the SFC).

The full-mesh configuration can also be modified to support various oversubscription permutations for DLCs 14. For example, instead of having four SFCs, the central switch fabric 12 may have only two SFCs 12-1, 12-2, with each DLC 14 using only two fabric ports 22 for communicating with the SFCs, one fabric port 22 for each of the SFCs 12. This permutation of oversubscription has, for example, each DLC on its network side with an aggregate ingress 400 Gbps bandwidth (40, 10 Gbps Ethernet Ports) and an aggregate egress 240 Gbps cell-switching bandwidth on its two 120 Gbps fabric ports 22 for communicating with the two SFCs. Other oversubscription permutations can be practiced.

Figure 4A:
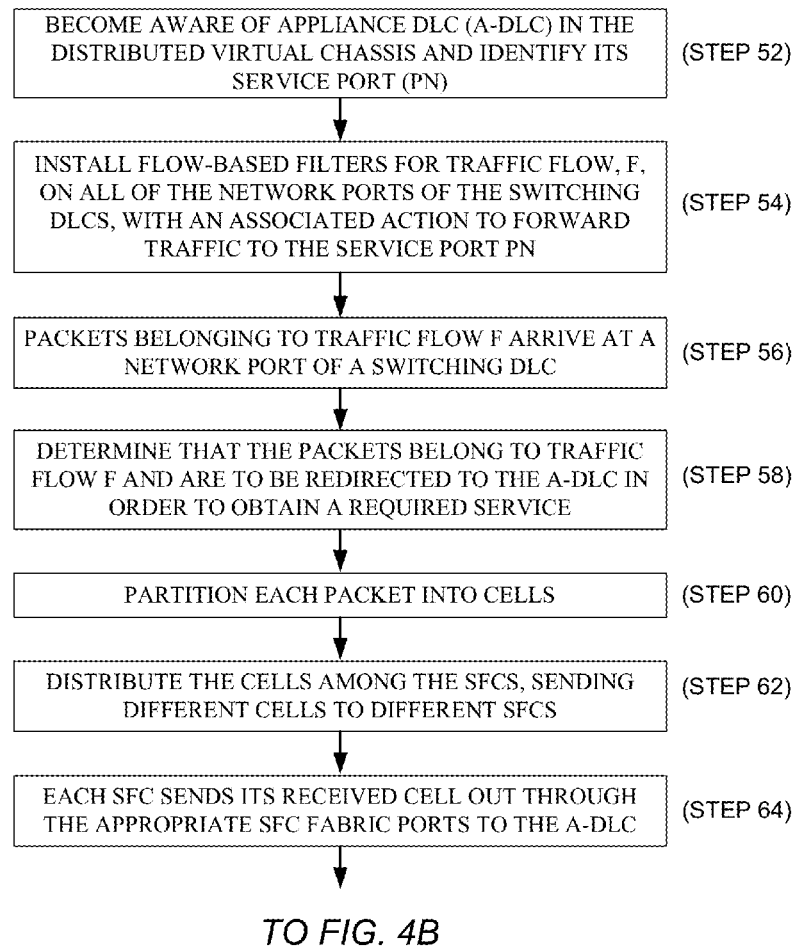
FIG. 4A and FIG. 4B is a flow diagram of a process for integrating Layer 4 through Layer 7 networking services in the distributed virtual chassis.
Figure 4B:
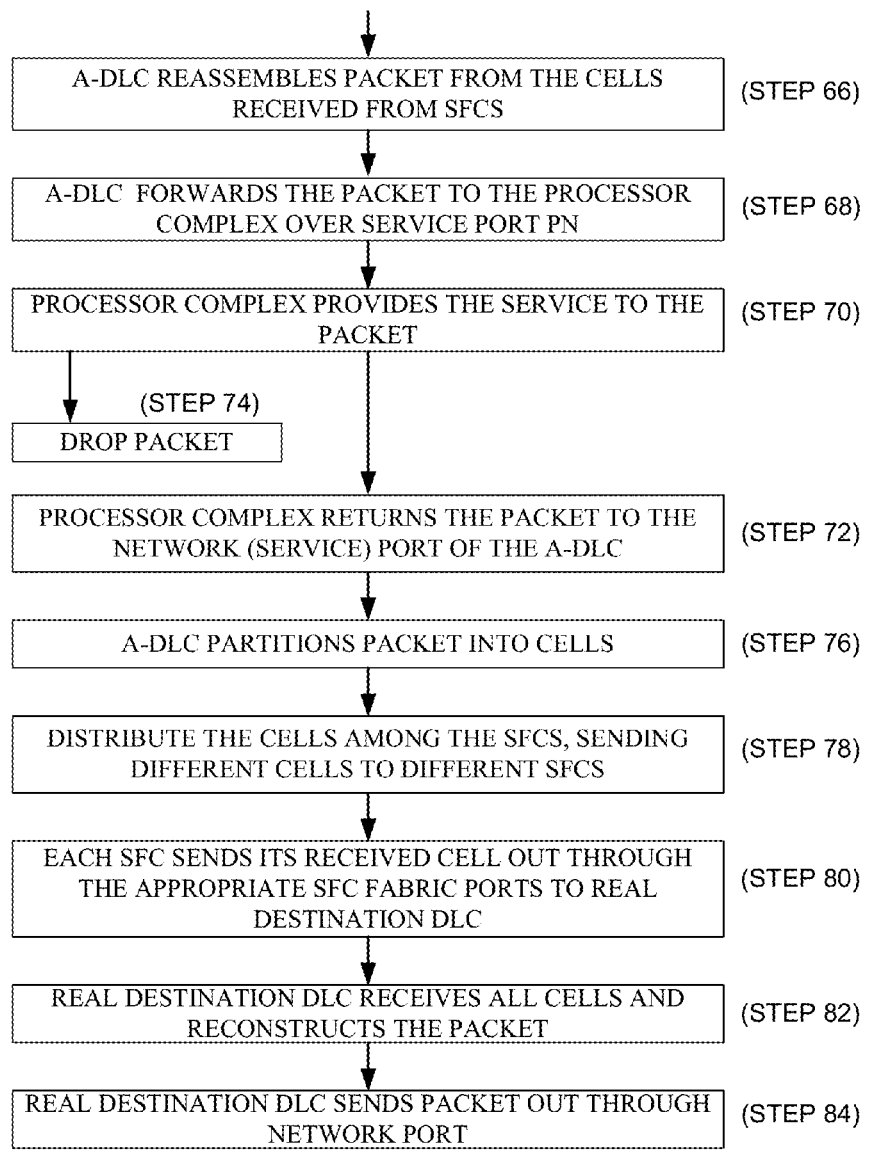

FIG. 4A and FIG. 4B show an embodiment of a process 50 for integrating Layer 4 to Layer 7 networking services in the distributed virtual chassis of FIG. 3. At step 52, the control plane (e.g., at the server 6) becomes aware of the presence of the A-DLC 14-N in the distributed virtual chassis and identifies its service port as Pn. The control plane can be made aware of the A-DLC automatically through use of a switch discovery protocol or manually through administrative configuration. For purposes of illustration, consider that packets arriving at the switching DLC 14-1 belong to a traffic flow, f, and require the service provided by the A-DLC 14-N. The traffic flow, f, is characterized by various parameters, including the source MAC address (smac), the destination MAC address (dmac), the source IP address (sip), the destination IP address (dip), the protocol or Ethernet type (proto), the source port (sport), the destination port (dport), and the virtual LAN (vlan) to which the traffic flow belongs.

To receive the required service, the packets of the traffic flow, f, need to be sent to the A-DLC 14-N. The control plane installs (step 54) flow-based filters for the traffic flow, f, on all of the switching network ports 20 of the switching DLCs 14, with an associated action such as "forward_to_new_port(Pn) ". In embodiments having multiple network (i.e., service) ports 20 that connect the network processor 24 to the processor complex 28 of the A-DLC 14-N, the control plane can manage traffic filters to achieve load balancing across the network (i.e., service) ports 20. The load balancing can ensure the A-DLC 14-N does not become a point of congestion on the distributed virtual chassis.

In addition, the number of service ports generally corresponds to the amount of bandwidth that the A-DLC 14-N has for packet processing. Thus, the control plane can correlate the total number of service ports to the total number of flows to be inspected. Depending upon the number of service ports, Pn, the control plane accepts flow configurations. Alternatively, the control plane can suggest the bandwidth requirements for the A-DLC 14-N.

Packets belonging to traffic flow f arrive (step 56) at a network port 20 of the switching DLC 14-1. In response to the installed traffic filter, the network processor 24 in communication with this network port 20 determines (step 58) that the packets belong to traffic flow f and are to be redirected to the A-DLC 14-N in order to obtain a required service. The network processor 24 adds a pre-classification header to the packet and partitions (step 60) each packet into cells, adding a cell header (used in ordering of cells) to each cell. (Each service port is mapped to an output traffic manager port (otm_port) on the chip of the switching DLC. Each of the otm-ports has a VOQ (virtual output queue) on all switching DLCs. This otm-port is specified in the cell header). The network processor 24 then sends (step 62) the cells out through the fabric ports 22 to each of the SFCs 12, sending different cells to different SFCs 12.

For example, consider an incoming packet with a length of 1600 bits. To the packet, the network processor 24 of the switching DLC 14-1 adds a pre-classification header of fixed size (e.g. 160 bits). The network processor 24 then divides the packet with the pre-classification header into multiple cells of a certain size (e.g., 256 bytes, 128 bytes, 64 bytes). The network processor 24 then sends a different cell to each of the four SFCs 12, in effect, achieving a load balancing of the cells across the SFCs 12.

The cell-based switch fabric element 16 of each SFC 12 that receives a cell examines the header of that cell, determines its destination as the A-DLC 14-N, and sends (step 64) the cell out through the appropriate one of the fabric ports 18 of that SFC to the A-DLC 14-N. The A-DLC 14-N receives these cells belonging to the packets of traffic flow f on its fabric ports 22. The network processor 24 of the A-DLC reassembles (step 66) each packet of the traffic flow f from these cells, and forwards (step 68) each reassembled packet to the processor complex 28 over the service port Pn (i.e., the network port 20 allocated to the service port Pn). The processor complex 28 provides (step 70) the service to each packet.

Depending upon the outcome of the provided service, the packet is either forwarded (step 72) to the real destination or dropped (step 74) based on the action matched. When sending the packet onward to the real destination, the processor complex 28 sends (step 76) the packet back to the network processor 24 over the service port Pn. In the process, the network processor 24 does not learn either the source MAC address or source IP address of the packet. The network processor 24 then partitions (step 78) the packet into cells, and sends (step 80) the cells out through the fabric ports 22 to each of the SFCs 12, sending different cells to different SFCs 12, for subsequent delivery to the real destination DLC.

The real destination DLC 14 receives (step 82) all cells related to the serviced packets from the SFCs, reassembles the packet (i.e., removing the added headers, combining the cells), and sends (step 84) the reconstructed packet out through the appropriate one of its network ports 20. Continuing with the previous four-cell example, consider that each SFC 12 determines that the real destination DLC is DLC 14-2. Each SFC 12 sends its cell out through its fabric port 18-2 to the DLC 14-2. The DLC 14-2 reassembles the packet from the four received cells (the added packet headers providing an order) and sends the packet out of the appropriate network port 20. The pre-classification header information in the cells determines the appropriate network port.

Figure 5:
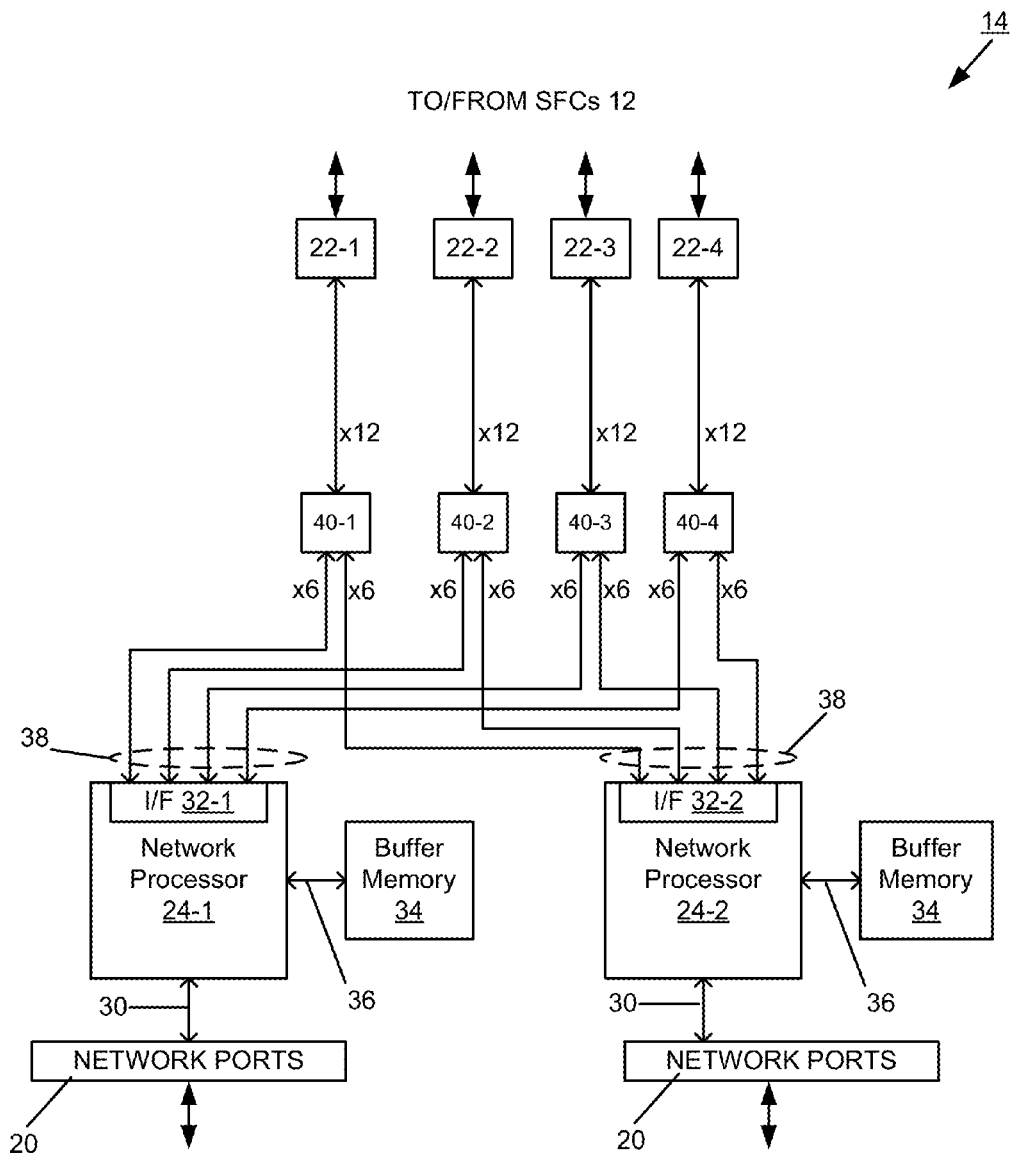
FIG. 5 is a functional block diagram of an embodiment of a switching DLC box having two network processors.

FIG. 5 shows a diagram of an embodiment of each switching DLC having the network ports 20 in communication with the network processors 24-1, 24-2 through a PHY interface 30. In one embodiment, the PHY interface 30 includes an XFI electrical interface (of a 10 Gigabit Small Form Factor Pluggable Module (XFP)) for each of the network ports 20. Each network processor 24 has a fabric interface (I/F) 32 and is in communication with buffer memory 34 over memory channels 36. In one embodiment, the buffer memory 34 is implemented with DDR3 SDRAM (double data rate synchronous dynamic random access memory) devices.

The fabric interface 32 of each network processor 24 includes a serializer/deserializer (SerDes), not shown, that preferably provides 24 channels 38. The SerDes includes a pair of functional blocks used to convert data between serial and parallel interfaces in each direction. In one embodiment, each SerDes channel 38 operates at a 10.3 Gbps bandwidth; the aggregate bandwidth of the 24 channels being approximately 240 Gbps (or 480 Gbps when taking both fabric interfaces). In another embodiment, each SerDes channel operates at a 25 Gbps bandwidth. The 24 SerDes channels 38 are grouped into four sets of six channels each.

The DLC 14 further includes PHYs 40-1, 40-2, 40-3, 40-4 (generally 40) in communication with the four (e.g., standard IB CXP) fabric ports 22-1, 22-2, 22-3, 22-4, respectively, of the DLC 14. Each of the PHYs 40 is also in communication with a group of six SerDes channels 38 from each of the two network processors 24-1, 24-2 (thus, each of the PHYs 40 supports 12 SerDes channels 38).

Figure 6:
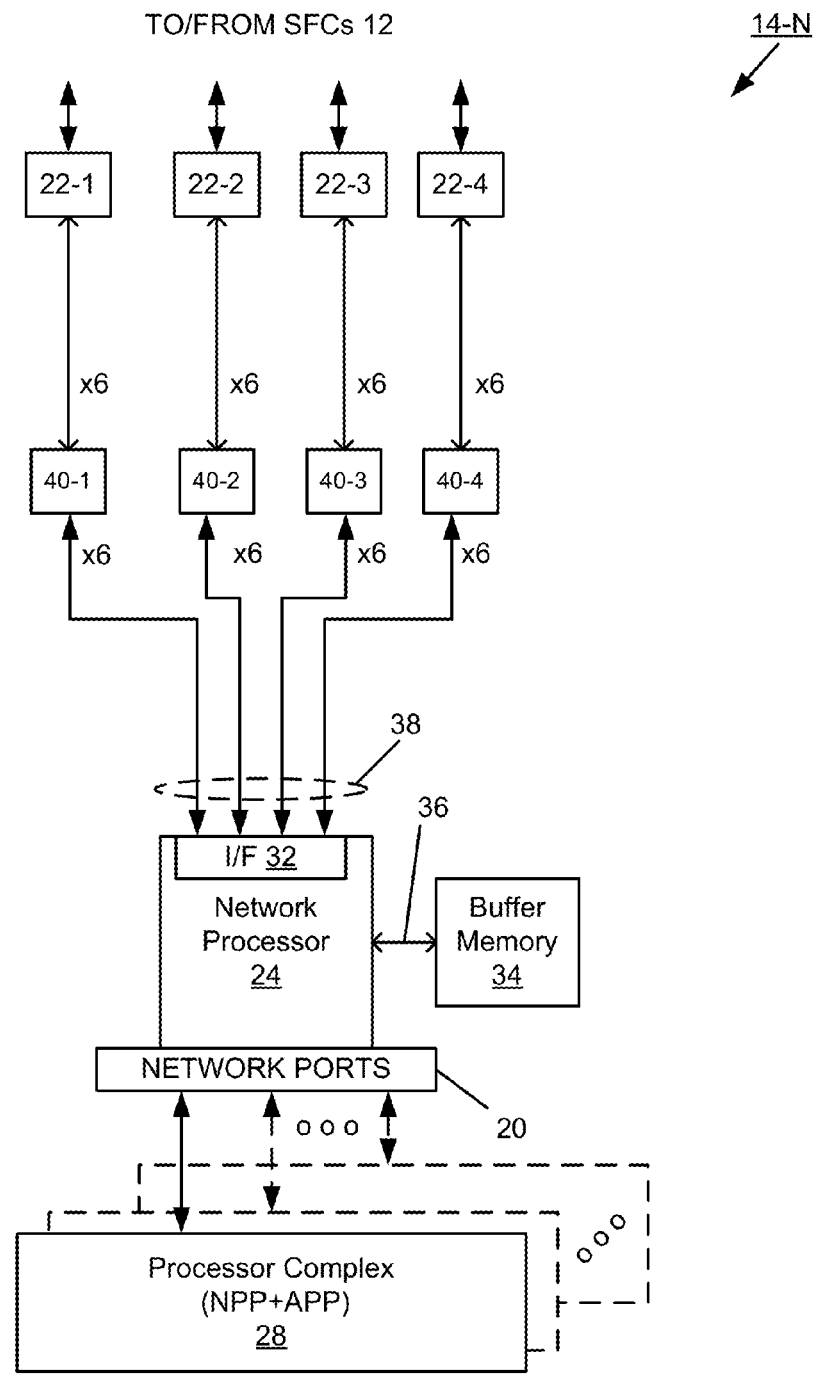
FIG. 6 is a functional block diagram of an embodiment of a service appliance DLC (A-DLC) box including one or more processor complexes.

FIG. 6 shows a diagram of an embodiment of the appliance DLC 14-N including the network processor 24 with a fabric interface (I/F) 32. The fabric interface 32 includes a serializer/deserializer (SerDes), not shown, that preferably provides 24 channels 38. Each SerDes channel 38 preferably operates at a 10.3 Gbps bandwidth. The aggregate bandwidth of the 24 channels is approximately 240 Gbps. In another embodiment, each SerDes channel operates at a 25 Gbps bandwidth. The 24 SerDes channels 38 are grouped into four sets of six channels each.

The appliance DLC 14-N further includes buffer memory 34 (e.g., DDR3 SDRAM), which is in communication with the network processor 24 over memory channels 36. The A-DLC 14-N further includes PHYs 40-1, 40-2, 40-3, 40-4 (generally 40) in communication with the four (e.g., standard IB CXP) fabric ports 22-1, 22-2, 22-3, 22-4, respectively, of the DLC 14-N. Each of the PHYs 40 is also in communication with a group of six SerDes channels 38 from the network processors 24 (thus, each of the PHYs 40 supports six SerDes channels 38).

In addition, the network processor 24 is in communication with one or more processor complexes 28 through the network ports 20 of the network processor chip 24.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of integrating an upper layer service into a distributed virtual chassis comprised of a plurality of scaled-out fabric coupler (SFC) chassis, one or more switching network elements, and a service appliance, the method comprising:
   associating a network port of a switching network element with a traffic filter for a traffic flow;
   receiving a packet at the network port of the switching network element;
   determining, in response to the traffic filter, that the packet requires an upper layer service provided by the service appliance;
   dividing, by the switching network element in response to the traffic filter, the packet into cells each indicating that the service appliance is a destination for that cell;
   sending, by the switching network element, a different cell of the packet to each SFC chassis of the plurality of SFC chassis;
   forwarding, by each SFC chassis, the cell received by that SFC chassis to the service appliance through a cell-based switch fabric of that SFC chassis;
   receiving, by the service appliance, each cell of the packet from a different SFC chassis of the plurality of SFC chassis;
   reassembling the packet at the service appliance from the cells received from the plurality of SFC chassis; and
   performing the upper layer service on the reassembled packet at the service appliance.

2. The method of claim 1, further comprising forwarding, by the service appliance in response to a result of performing the upper layer service, the packet towards an original destination network element by dividing the packet into cells and sending different cells of the packet to different SFC chassis.

3. The method of claim 2, further comprising reassembling the cells, by the original destination network element, into the packet.

4. The method of claim 2, further comprising dropping the packet by the service appliance in response to a result of performing the upper layer service.

5. The method of claim 1, wherein the upper layer service performed by the service appliance is performed by a processor complex of the service appliance, and wherein the processor complex is in communication with a network processor of the service appliance by multiple service ports, and further comprising load balancing packets sent to the service appliance across the service ports.

6. The method of claim 1, wherein the service appliance includes a network processor in communication with a processor complex by one or more service ports, the network processor forwarding packets to the processor complex in order to receive the upper layer service and receiving packets from the processor complex after the upper layer service without learning a source IP addresses or source MAC addresses of the packets sent back by the processor complex.

7. The method of claim 1, wherein the upper layer service provides a function performed at an abstract layer corresponding to Layer 4 or higher of an International Organization for Standardization (ISO) Open System Interconnection (OSI) model.

8. A method of providing an upper layer service in a data center, the method comprising:
 receiving, at a service appliance chassis, a different cell of a packet from each of a plurality of scaled-out fabric coupler (SFC) chassis;
 reassembling, by a network processor of the service appliance chassis, the packet from the cells received from the plurality of SFC chassis;
 forwarding, by the network processor of the service appliance chassis, the reassembled packet to a processor complex of the service appliance chassis over a network port coupling the network processor to the processor complex; and
 performing, by the processor complex of the service appliance chassis, the upper layer service on the reassembled packet.

9. The method of claim 8, further comprising:
 returning, by the processor complex of the service appliance chassis, the packet to the network processor over the network port after performing the upper layer service on the reassembled packet;
 dividing, by the network processor of the service appliance chassis, the reassembled packet into cells; and
 distributing, by the network processor of the service appliance chassis, different cells of the reassembled packet among the SFC chassis of the plurality of SFC chassis.

10. The method of claim 8, wherein the upper layer service provides a function performed at an abstract layer corresponding to Layer 4 or higher of an International Organization for Standardization (ISO) Open System Interconnection (OSI) model.

\* \* \* \* \*